United States Patent [19]

Hanst

[11] Patent Number: 5,401,312
[45] Date of Patent: Mar. 28, 1995

[54] METHOD FOR SOIL SURFACE STABILIZATION

[76] Inventor: Donald R. Hanst, 7911 Windy Acres, Houston, Tex. 77040

[21] Appl. No.: 141,487

[22] Filed: Oct. 22, 1993

[51] Int. Cl.[6] ............................................. C04B 14/00
[52] U.S. Cl. ..................................... 106/706; 106/793; 106/811; 106/DIG. 1; 106/DIG. 4; 106/900; 404/76; 404/90; 405/266
[58] Field of Search ............... 106/705, 706, 792, 793, 106/811, DIG. 1, DIG. 4, 900; 264/DIG. 49; 405/266; 404/75, 76, 90

[56] References Cited

U.S. PATENT DOCUMENTS

| | | |
|---|---|---|
| 1,934,689 | 2/1931 | Andrews et al. |
| 2,698,252 | 12/1954 | Havelin et al. ................. 106/706 |
| 2,815,294 | 12/1957 | Havelin et al. ................. 106/706 |
| 3,076,717 | 2/1963 | Minnick ..................... 106/DIG. 1 |
| 3,651,002 | 3/1972 | Higashimura et al. .......... 260/29.6 |
| 3,732,023 | 5/1973 | Rank et al. ..................... 404/90 |
| 3,971,222 | 7/1976 | Griffith, Jr. ................... 61/36 R |
| 4,018,619 | 4/1977 | Webster .................... 106/DIG. 1 |
| 4,084,381 | 4/1978 | Cain et al. ................. 106/DIG. 1 |
| 4,105,463 | 8/1978 | Angelbeck ..................... 106/900 |
| 4,233,015 | 10/1980 | Teague et al. ................. 405/263 |
| 4,312,605 | 1/1982 | Clarke ......................... 405/264 |
| 4,318,835 | 3/1982 | Clarke .......................... 264/36 |
| 4,329,090 | 5/1982 | Teague et al. ................. 405/263 |
| 4,464,353 | 8/1984 | Hains .......................... 423/640 |
| 4,473,320 | 9/1984 | Register ........................ 404/75 |
| 4,496,267 | 1/1985 | Gnaedinger .................... 404/82 |
| 4,514,307 | 4/1985 | Chestnut et al. ............... 210/751 |
| 4,549,834 | 10/1985 | Allen ........................... 404/75 |
| 4,615,809 | 10/1986 | King ........................... 106/706 |
| 4,746,249 | 5/1988 | Haigh et al. ................... 405/264 |
| 4,871,283 | 10/1989 | Wright ......................... 405/263 |
| 4,990,025 | 2/1991 | Young et al. ................... 404/92 |
| 5,018,906 | 5/1991 | Bonier-Sahuc .................. 405/263 |
| 5,116,417 | 5/1992 | Walker et al. ............. 106/DIG. 1 |
| 5,122,012 | 6/1992 | Walker ......................... 405/263 |
| 5,186,742 | 2/1993 | Hoffman ........................ 75/773 |

OTHER PUBLICATIONS

1993, "Standard Specifications for Construction of Highways, Streets and Bridges", pp. 222-241, Texas Department of Transportation no month.
"After Five Years, Lime Base Stabilization Holds Up", Roads & Bridges, May 1993.

Primary Examiner—Mark L. Bell
Assistant Examiner—Michael Marcheschi
Attorney, Agent, or Firm—Dorsey L. Baker

[57] ABSTRACT

Abstract A method for stabilizing the upper layers of the earth's surface is claimed that comprises the steps of: mixing an amount of lime with an amount of water, simultaneously or sequentially mixing an amount of fly ash with the lime/water mix to form a slurry, distributing said slurry onto the earth's surface and working said slurry into the upper layers of the earth's surface.

14 Claims, 1 Drawing Sheet

METHOD FOR SOIL SURFACE STABILIZATION

TECHNICAL FIELD OF THE INVENTION

The present invention relates to a lime-fly ash slurry composition and to methods for strengthening and stabilizing the surface layers of the earth so as to provide a solid foundation for roadbeds, railways and the like. This invention also relates to a method for rehabilitating asphalt and concrete roads and foundations. More particularly, the present invention discloses a method for producing a lime-fly ash slurry that is capable of suspending a large proportion of solid particles for an extended period of time, and a method for deploying that slurry into the surface layers of the earth to create a strong, stabilized bed.

BACKGROUND OF THE INVENTION

Lime has long been known to be useful in various structural applications. Typically, the starting substance for lime applications is either hydrated (slaked) lime or unhydrated (quicklime). Several patents disclose methods and equipment for hydrating lime, including U.S. Pat. Nos. 783,570, 1,579,766, 1,664,598, and 2,044,553.

In addition to lime, fly ash has, to a limited extent, also been used to stabilize road or rail road beds. Such, lime-fly ash mixes have been used in the dry form and, to a limited extent, they have also been used in a high pressure injection slurry medium.

Typically, however, such dry mixes as well as the slurries require special care in mixing and handling. For example, systems that provide for the distribution of powdered constituents on the earth, followed by the addition of water and subsequent mixing into the earth create substantial dusting problems which are exacerbated by the caustic nature of the dust. In addition, when quicklime is used, such systems may pose short-term hazards to operators, as the hydration reaction is exothermic. Finally, the high pressure injection slurries are not directed to the surface layers of the soil. They also present problems of a fast setting time that requires immediate injection. Some examples of patents disclosing various lime/ash mixtures are as follows:

U.S. Pat. No. 4,496,267 discloses prereacting a mixture of incinerator ash, rather than fly ash, and lime for several days, and then adding time and water to the prereacted mixture and working it into the surface of the road bed.

U.S. Pat. No. 4,105,463 discloses a composition comprising about 2-8 percent time, about 8-36 percent fly ash, from 66 to 90 percent aggregate, and 0.5-4 percent sludge. These are mixed to produce a composite to which water can be added to form a cementitious product.

U.S. Pat. No. 3,076,717 discloses a composition having little early compressive strength but having very high early bearing power. The composition comprises 10-30 percent of a pozzolan such as fly ash, 70-90 percent of an aggregate having a specific particle size distribution, about 2-6 percent lime, and excess water of about 7-10 percent.

U.S. Pat. Nos. 2,564,690, 2,698,252, and 2,815,294 disclose compositions comprising lime, fly ash and fine aggregate for stabilizing soil having a particular fineness.

U.S. Pat. No. 4,329,090 discloses a method of mixing quicklime and water to form a hot hydrated lime slurry and working the hot slurry into the earth before it cools.

The patent also discloses parts of an apparatus for accomplishing the mixing of quicklime into the water in a particular manner. Specifically, the '090 patent teaches injecting the quicklime below the surface of the water and stirring the mixture to prevent any localized concentration of quicklime particles, the hydration of which might be undesirably violent. Likewise, systems exist which provide for the injection of a lime-fly ash slurry into the subsurface layers of the earth. These systems not only require special injection equipment for piercing the upper layers of the earth, but, typically, they also require that the slurry be mixed only minutes before it is injected in order to avoid undesirable setting of the mixture before injection. This greatly reduces the flexibility of the operation with respect to supply, transport and procedure.

U.S. Pat. No. 4,084,381 discloses a lime-fly ash slurry comprising about 20-60 percent solids. The slurry is injected at predetermined, spaced-apart locations, at predetermined depths up to 10-20 feet. Of the solids, the lime comprises about 25-50 percent by weight. The fly ash is preferred to be the self-hardening type, having preferably greater than 10 percent by weight calcium oxide.

U.S. Pat. No. 4,233,015 discloses a method of treating subsurface layers of the earth by mixing quicklime and water to form a hot hydrated lime slurry and injecting the hot slurry into the earth before the slurry cools. Specifically, the '015 patent teaches injecting the quicklime below the surface of the water and using a series of rotating paddles to stir the mixture and to prevent any localized concentration of quicklime particles.

U.S. Pat. No. 4,871,283 discloses injecting a mixture consisting essentially of water, particulate hydrated lime and particulate fly ash, wherein the solids are present as about 25 to 200 percent by weight of the water. The disclosed ratio of lime to fly ash ranges from 3:1 to about 1:10. It is preferred that Type C fly ash having at least 5 percent and preferably at least 10 percent calcium oxide be used, and it is stressed at column 7, lines 16-22, that the injection should occur within ten minutes of mixing of the components.

U.S. Pat. 4,871,283 also specifically teaches that Type F fly ash cannot be used in the patented method without other additives. This is directly contrary to the nature of the present invention.

Many states have prior art specifications relating to the use of lime and of fly ash as stabilizing systems for road beds. For example, the Texas Department of Transportation has issued "Standard Specifications for Construction of Highways, Streets and Bridges. Its 1993 edition, at page 228, continues to call for the application of fly ash in "dry form" only. As will be demonstrated, the present invention will reduce both the cost and the environmental hazards that result from such specifications.

The present invention avoids the problems associated with the prior systems and provides a safe, economical method for stabilizing a road bed. Other objects and advantages of the invention will appear from the following description.

SUMMARY OF THE INVENTION

The present invention is a method and composition for stabilizing and strengthening the upper layers of the earth's surface using a slurry that is low cost, safe and free of environmental hazards. The present method preferably comprises the steps of mixing an amount of quicklime and fly ash with an amount of water to form a slurry, applying the slurry to the surface or road bed and then mixing said slurry into the soil of the surface by cutting, disking, scarifying and, if needed, by pulverizing. Accordingly the objectives of my invention are to provide a method and composition that
 a) eliminates the potential problems of premature setup and curing of the material after mixing and prior to application so as to reduce the risk of valve, dispenser and tank equipment repairs;
 b) maintains the fly ash in proper suspension so as to permit a proper uniform application without clogging the valves, dispensers and tank equipment;
 c) will not be too brittle and inflexible to serve as a stabilized road bed or support base;
 d) provides a superior, more durable base and foundation for a road bed, building foundation or railroad bed; and
 e) has a substantially lower cost of mixing and application.

BRIEF DESCRIPTION DRAWINGS

The manner in which the forgoing objectives are obtained is set forth in the following detail specifications and the drawing in which FIG. 1 illustrates an elevational view of the rear of a tank truck that may be used to dispense and spread the slurry of my invention.

DETAILED DESCRIPTION OF THE INVENTION

Figure 1:
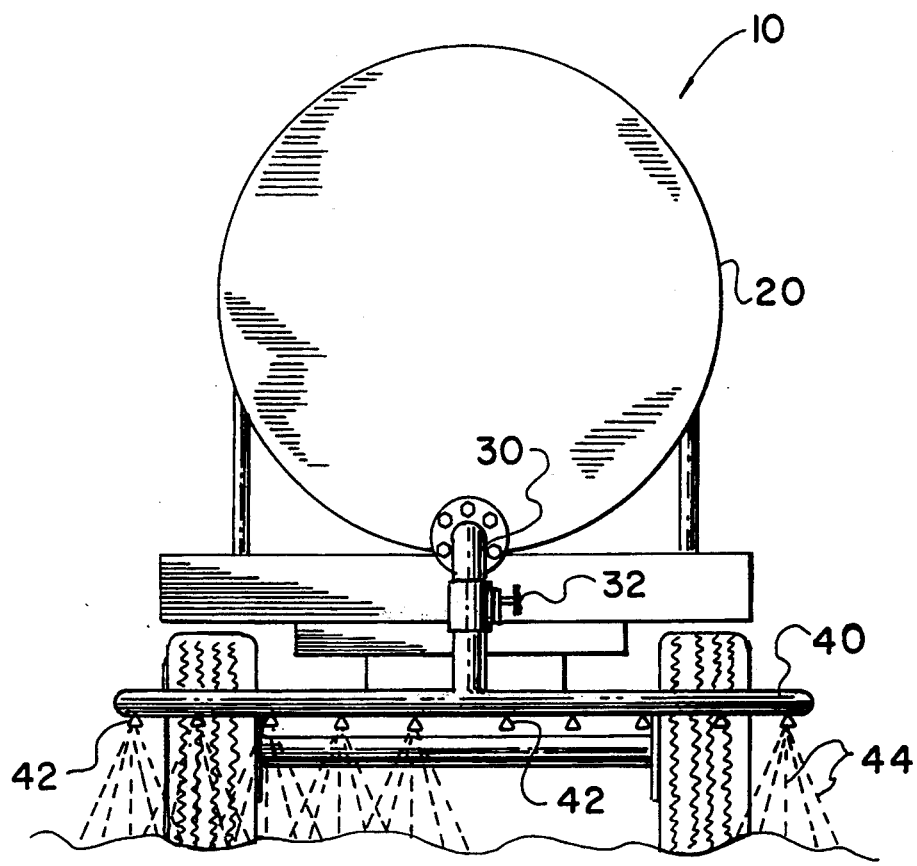

According to the preferred embodiment of my invention, a composition slurry is formed of quicklime, water and type F fly ash for application to a road bed. Preferably, the quicklime is first mixed with the water and then the fly ash is subsequently added. This slurry composition may be mixed in a mixing tank such as those manufactured and sold under the trademark Perma Batch ® mixers by the Chemical Lime Group of Fort Worth, Tex. After mixing and without undue delay, the slurry is transferred by a pump to the tank 20 of a dispensing truck 10 such as that illustrated in FIG 1. The slurry is then transported to the road bed or other application site where it is to be applied. At the application site, the slurry flows by gravity (or pumped if desired) through the discharge pipe 30, a control valve 32 to the spreader bar 40 from which the slurry is sprayed, as at 44, upon the surface of the road bed. Thereafter, the slurry is cut into the road bed by earth working implements such as disks, scarifying and pulverizers. Accordingly, the slurry invention is not injected into the ground. Instead, it is preferably distributed evenly onto the earth and worked into the upper 24 inches of earth by conventional methods. Because the present method involves distributing and mixing a slurry rather than a dry powder, the dusting and other environmental hazards associated with dry distribution of time are avoided.

The invention has equal, if not greater, applicability to the rebuilding and repair of asphaault and concrete roads. In their repair, the older roads are first pulverized. Subsequently, this slurry is sprayed upon the surface and then cut or worked in to the resulting mixture.

My preferred slurry composition includes quicklime, which upon mixing with water, results in an exothermic reaction that generates heat. The advantage of using quick lime (unhydrated lime) is that it is not necessary to pay additional freight costs associated with the transportation of the waters of hydration, as is the case of using hydrated lime. Thus, a cost savings may be realized through the use of quicklime. Surprisingly, I have also found that if quicklime is used, such will also maintain the fly ash in suspension within the slurry and minimize any problem of settling out, of clogging the equipment or of uneven distribution on the ground surface.

I also prefer to use a type F fly ash because it has a low calcium oxide level that reduces the settling tendency of the fly ash. The fly ash may be added to the mixing tank slurry after all of the lime has been mixed with the water, or it may be simultaneously mixed with the lime and water. The type of fly ash employed in the slurry is a pozzolanic by-product of coal-burning power plants. Preferably, the fly ash is Type F fly ash, having a calcium oxide content of less than 18 percent. Type F fly ash is a common by-product of the combustion of anthracite, bituminous and lignite coal. In contrast, Type C fly ash is produced in the combustion of sub-bituminous coal or lignite coal. Because it contains more calcium than Type F, Type C fly ash typically sets up more quickly and is therefore more difficult to use in the method of the present invention. The presence of excessive (more than 18% by weight) calcium oxide results in rapid setting of the slurry, reduction of available work time and often, a clogging of the equipment.

According to the preferred embodiment, in which type F ash is used, it is possible to store the slurry for extended periods, on the order of several hours, without appreciable setting. In contrast, if type C fly ash is used, it is necessary to add chemical retarders to the slurry so that premature setting of the slurry is avoided. One such retarder is that sold under the brand name "Possolith 100 XR" by Master Builders of Cleveland, Ohio.

The weight ratio of fly ash to lime should be from about 10:1 to 1:4. Preferably, the ratio of fly ash to lime in the slurry is approximately 3:1 by weight. The slurry has a solids content from about 35 percent to about 200 percent by weight of water. Preferably, the final slurry has a solids content of about 35 percent by weight. Such a slurry can be maintained without setting up for several hours, so that it can be mixed a distant plant, if desired, and transported to the point of application as explained above. In some instances, the ratio of lime to fly ash will be set by owner of the road, such as the Highway Department.

The preferred embodiment of the present invention is best suited for use in sandy, silky soils. In such environments, it will provide excellent results because the resulting layer formed by the interaction of the slurry ingredients with the soil forms a cement-like sand with good stability. The fly ash is an important ingredient in these applications, because such soils contain little or no clay with which the lime can bond. The addition of fly ash provides a source of aluminum and silica, which, together with the lime, are capable of forming bonds within the soil layer. The soil treated in this manner is flexible and able to resist large compressive forces.

While a preferred embodiment of the invention has been shown and described, modifications thereof can be made by one skilled in the art without departing from the spirit of the invention. For example my slurry composition may use, as a substitute for the quick lime, a hydrated or slaked lime. Such will be quite acceptable if an additive is used to insure that the fly ash remains in suspension. One such additive that may be used to insure such suspension of the fly ash is bentonite. If bentonite is used, preferably, it should not exceed 10 percent by weight of the slurry. In addition, Type C fly ash may be used as an acceptable substitute for the Type F fly ash. If so used, care should be taken to consider the addition of retarders to the slurry such as "Pozzolith 100XR" so that premature setting of the slurry is avoided. Those skilled in the art will appreciate other substitutes for the mentioned retarders and suspension agents.

I claim:

1. A method for stabilizing the upper layers of the earth's surface, comprising the steps of:
   a) forming a slurry of lime, fly ash and water in which the slurry has a solids content in excess of 35% by weight and the amount of fly ash is approximately three times the amount of lime by weight.
   b) applying, through means other than injection under pressure, said slurry to the earth's surface; and
   c) mixing said slurry into the upper layers of the earth's surface to form a stable soil layer.

2. The method according to claim 1 wherein said fly ash has a calcium oxide content of less than eighteen percent.

3. The method according to claim 1 wherein said lime is quicklime.

4. The method according to claim 1 wherein said lime is hydrated lime and said slurry includes bentonite.

5. A method for stabilizing the upper layers of the earth's surface, comprising the steps of:
   a. mixing an amount of lime with an amount of water;
   b. concurrently or sequentially mixing an amount of fly ash with the lime and water mixture to form a slurry;
   c. distributing said slurry onto the earth's surface by other means than injection under pressure; and
   d. working said slurry into the earth's surface.

6. The method according to claim 5 wherein the weight-ratio of fly ash to lime is from 10:1 to 1:4.

7. The method according to claim 5 wherein said slurry has a solids content of from about 35 percent to about 200 percent by weight.

8. The method according to claim 5 wherein said fly ash contains less than 18 percent calcium.

9. The method according to claim 8 wherein said fly ash is Type F fly ash.

10. The method according to claim 5 wherein said lime is hydrated lime.

11. The method according to claim 5 wherein said lime is quicklime.

12. A method for stabilizing the upper layers of the earth's surface, comprising the steps of:
   a. mixing an amount of quicklime with an amount of water;
   b. mixing an amount of type F fly ash with the lime and water mixture to form a slurry, said amount of fly ash being approximately three times said amount of lime by weight and said slurry having a solids content of from about 35 percent to about 200 percent by weight of water;
   c. distributing said slurry evenly on the surface of the earth by other means than injection under pressure, and
   d. working said slurry into the surface of the earth to form a stable soil layer.

13. A method of rehabilitating roads having surfaces of asphalt, and concrete, said method comprising the steps of:
   a. pulverizing the old surface;
   b. mixing an amount of hydrated lime with an amount of water;
   c. mixing an amount of type F fly ash with lime and water to form a slurry, the ratio of the fly ash to the lime being from 10:1 to 1:4 and said slurry having a solids content of from about 35 percent to about 200 percent by weight of water;
   d. distributing, without injection under pressure, said slurry evenly on the pulverized surface, and
   e. working said slurry into the pulverized surface and permitting the layer to form into a stabilized layer.

14. A method as set forth in claim 13 in which the weight ratio of fly ash to lime is approximately 3:1.

* * * * *

UNITED STATES PATENT AND TRADEMARK OFFICE
CERTIFICATE OF CORRECTION

PATENT NO. : 5,401,312
DATED : March 28, 1995
INVENTOR(S) : Donald R. Hanst

It is certified that error appears in the above-indentified patent and that said Letters Patent is hereby corrected as shown below:

Column 1, lines 46 and 51 "time" should read --lime--.

Signed and Sealed this

Sixteenth Day of April, 1996

Attest:

BRUCE LEHMAN

Attesting Officer

Commissioner of Patents and Trademarks